United States Patent
Sakai

(10) Patent No.: US 10,551,175 B2
(45) Date of Patent: Feb. 4, 2020

(54) 3D-SHAPE AUTO-TRACING METHOD AND MEASURING APPARATUS

(71) Applicant: MITUTOYO CORPORATION, Kanagawa (JP)

(72) Inventor: Hiroshi Sakai, Kanagawa (JP)

(73) Assignee: MITUTOYO CORPORATION, Kanagawa (JP)

( * ) Notice: Subject to any disclaimer, the term of this patent is extended or adjusted under 35 U.S.C. 154(b) by 0 days.

(21) Appl. No.: 16/249,127

(22) Filed: Jan. 16, 2019

(65) Prior Publication Data

US 2019/0219387 A1 Jul. 18, 2019

(30) Foreign Application Priority Data

Jan. 17, 2018 (JP) .................. 2018-005990

(51) Int. Cl.
*G06T 7/55* (2017.01)
*G01B 11/24* (2006.01)
*G02B 26/10* (2006.01)
*G06K 9/68* (2006.01)

(52) U.S. Cl.
CPC ........ *G01B 11/2441* (2013.01); *G02B 26/101* (2013.01); *G06K 9/685* (2013.01); *G06T 7/55* (2017.01); *G01B 2210/52* (2013.01); *G06T 2200/04* (2013.01)

(58) Field of Classification Search
CPC ... G01B 11/2441; G01B 2210/52; G06T 7/55; G02B 26/101; G06K 9/685

USPC .......................................................... 356/610
See application file for complete search history.

(56) References Cited

U.S. PATENT DOCUMENTS

2016/0153772 A1* 6/2016 Jeong ................. G01B 11/2531
356/610

FOREIGN PATENT DOCUMENTS

JP 2008-201914 A 9/2008
JP 6095486 B2 3/2017

* cited by examiner

*Primary Examiner* — Roy M Punnoose
(74) *Attorney, Agent, or Firm* — Greenblum & Bernstein, P.L.C.

(57) ABSTRACT

In a first step, numbering with a reference field of view at one area set first by an operator being defined as an original point is performed. In a second step, a place adjacent to a side around the reference field of view is numbered, then the measurement range is automatically moved to sequentially execute measurement at that position, presence of shape data is checked, measurement results is stored, and, presence of shape data at the numbered position is recorded on a memory device. In a third step, field of view with shape data found therein as a next reference field of view is employed, a place adjacent to a side around the reference field of view is numbered, then the measurement range is automatically moved to sequentially execute measurement at that position other than a position at which measurement has already been made or no shape data is found.

13 Claims, 6 Drawing Sheets

Fig. 6

| 1 | REFERENCE FILED OF VIEW 1 | ADDRESS: 0,0 | SHAPE DATA FOUND | → MEASURED FIELD OF VIEW 1 |
|---|---|---|---|---|
| 2 | RETRIEVAL FIELD OF VIEW 1 | ADDRESS:-1,0 | SHAPE DATA NOT FOUND | → FIELD OF VIEW WITH NO DATA |
| 3 | RETRIEVAL FIELD OF VIEW 2 | ADDRESS:0,1 | SHAPE DATA NOT FOUND | → FIELD OF VIEW WITH NO DATA |
| 4 | RETRIEVAL FIELD OF VIEW 3 | ADDRESS:1,0 | SHAPE DATA FOUND | → REFERENCE FIELD OF VIEW 2 |
| 5 | RETRIEVAL FIELD OF VIEW 4 | ADDRESS:0,-1 | UNCHECKED | → UNRETRIEVED FIELD OF VIEW 1 |
| ⋮ | ⋮ | ⋮ | ⋮ | ⋮ |

Fig. 7

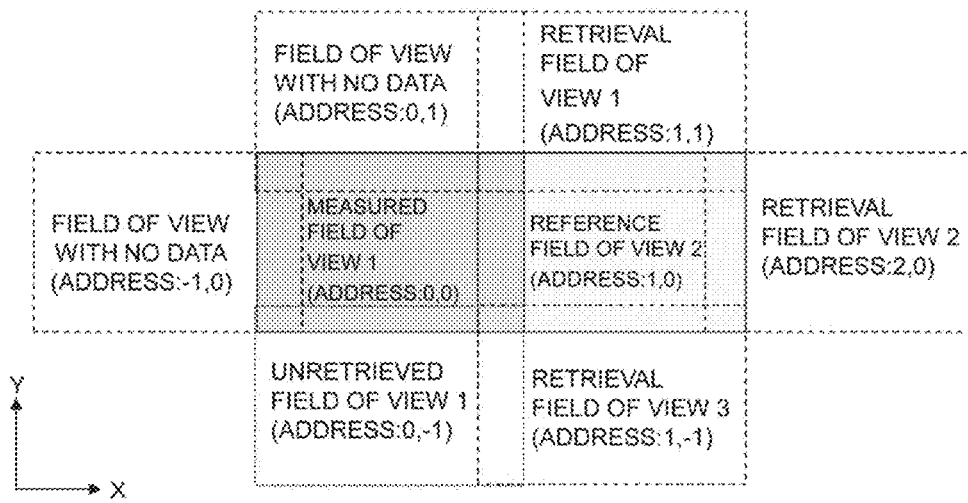

3D-SHAPE AUTO-TRACING METHOD AND MEASURING APPARATUS

CROSS-REFERENCE TO RELATED APPLICATION

The disclosure of Japanese Patent Application No. 2018-005990 filed on Jan. 17, 2018 including specifications, drawings and claims are incorporated herein by reference in its entirety.

TECHNICAL FIELD

The present invention relates to a 3D-shape auto-tracing method and a measuring apparatus. In particular, the present invention relates to a 3D-shape auto-tracing method, which is preferred for use with an image measuring apparatus or a 3D-shape measuring apparatus, and a measuring apparatus employing the method.

BACKGROUND ART

Image measuring apparatuses for making three-dimensional measurements of an object to be measured on the basis of image information acquired by an image capturing device may include, for example, one which employs the interference of white light having a wide spectrum width (the so-called WLI (White Light Interferometer) measurement) or one which employs contrast information (the so-called PFF (Points From Focus) measurement). Such an image measuring apparatus measures the three-dimensional shape of an object to be measured from the image information that is acquired at each vertical position by operating an image capturing device to scan in the vertical direction relative to a stage. Such an image measuring apparatus has been increasingly required, for example, of measurement in wider ranges in which the size of an object to be measured does not fall within one field of view of the image capturing device.

As a preparatory step for performing measurement in wider ranges, there has been a method for identifying a measurement range in advance with the help of CAD data (the offline teaching) (Japanese Patent Application Laid-Open No. 2008-201914). This method is to simplify the setting of measurement ranges with reference to design values.

On the other hand, there has also been a method including performing a preparatory measurement in advance in a short time using a low-power lens of a resolution coarser than desired for actual measurement, and identifying a desired measurement range on the basis of the acquired image (Japanese Patent No. 6095486).

SUMMARY OF INVENTION

Technical Problem

However, design values are not always available for workpieces to be measured.

Furthermore, when compared with a mechanism of fixed power, a mechanism mounted for both low-power and high-power measurement available for the preparatory measurement is considerably expensive and complicated.

Nevertheless, it has been required to measure, without time and effort, a continuous 3D shape of a size beyond the measurement range of one field of view.

In this context, it is an object of the invention to provide a method for automatically measuring the entire continuous shape of a continuous 3D shape of a size beyond the range of measurement of one field of view, while the measurement range is moved, only by measuring a 3D shape of one area in a reference field of view to thereby automatically measure an adjacent field of view.

Solution to Problem

The present invention addresses the problems by allowing a computer to execute the following steps when measuring a continuous 3D shape of a size beyond a measurement range of one field of view while the measurement range is moved: a first step of performing numbering with a reference field of view at one area set first by an operator being defined as an original point; a second step of numbering a place adjacent to a side around the reference field of view, then automatically moving the measurement range to sequentially execute measurement at that position, checking whether shape data is found, storing measurement results, and recording, on a memory device, whether shape data is found at the numbered position; a third step of employing a field of view with shape data found therein as a next reference field of view and numbering a place adjacent to a side around the reference field of view, then automatically moving the measurement range to sequentially execute measurement at that position other than a position at which measurement has already been made or no shape data is found, checking whether shape data is found, storing measurement results, and recording, on the memory device, whether shape data is found at the numbered position; and a fourth step of repeating the third step and determining that an entire continuous shape has been completely measured when any unmeasured position adjacent to a side around a position at which shape data is found is not found.

Herein, all the measurement results associated with the measured fields of view are coupled together, thereby enabling producing an entire shape.

Additionally, setting in advance a limit position of a search range makes it possible to determine that the search is ended when an automatic search has been completed within that range.

It is also possible to reduce a search time by limiting a search range in terms of the number of directions or fields of view.

The present invention also addresses the problem in the same manner by a measuring apparatus. The measuring apparatus is provided with: a stage configured to place thereon an object to be measured; an image capturing device which is provided movably relative to the stage and is configured to capture an image of the object to be measured within a predetermined image capturing range narrower than a measurement range to output image information; a position controller configured to move the image capturing device to a plurality of measurement positions within the measurement range and operate the image capturing device to scan in a direction perpendicular to the stage at each of the measurement positions; and a computer configured to compute a displacement in a scanning direction at each of the measurement positions on the basis of the image information in the predetermined image capturing range at each of the measurement positions acquired by the scanning of the image capturing device. The measuring apparatus measures a continuous 3D shape of a size beyond a measurement range of one field of view while the measurement range is moved. The measuring apparatus is characterized in that the computer is provided with: a first function of performing numbering with a reference field of view at one area set first by an operator being defined as an origin point; a second function of numbering a place adjacent to a side around the reference field of view, then automatically moving the measurement range to sequentially execute measurement at that position, checking whether shape data is found, storing measurement results, and recording, on a memory device, whether shape data is found at the numbered position; a third function of employing a field of view with shape data found therein as a next reference field of view and numbering a place adjacent to a side around the reference field of view, then automatically moving the measurement range to sequentially execute measurement at that position other than a position at which measurement has already been made or no shape data is found, checking whether shape data is found, storing measurement results, and recording, on the memory device, whether shape data is found at the numbered position; and a fourth function of repeating the third function and determining that an entire continuous shape has been completely measured when any unmeasured position adjacent to a side around a position at which shape data is found is not found.

Herein, the movement of the measurement range can be made while a certain overlap region is being maintained.

The measuring apparatus can also serve as an image measuring apparatus.

The 3D shape can also be produced from a plurality of captured images acquired by driving the stage in the optical axis direction of the image capturing device to capture the images.

The image measuring apparatus can also be configured to operate the image capturing device to capture images while the image capturing device is being moved in XY directions parallel to an upper surface of the stage and operated to scan in a Z-axis direction vertical to the upper surface of the stage, and to detect a displacement (Z value) of an object to be measured in the Z axis direction at each measurement position by the Point From Focus (PFF) measurement from measurement positional information of the image capturing device in the XY directions and contrast information in each micro range of an image acquired at that position.

Furthermore, it is possible to confirm that shape data is found when a contrast value is greater than 0.

The image measuring apparatus can also be configured to guide white light having a wide-band spectrum to an object to be measured and a reference surface, allow the respective reflected beams of light to interfere with each other to acquire a position at which a peak value of an interference signal of each pixel is observed, and detect a displacement of the object to be measured in a Z-axis direction vertical to the upper surface of the stage depending on the peak position of each pixel and a position of a reference plate that constitutes the reference surface.

Furthermore, when a peak of an interference signal can be calculated, it is possible to confirm that shape data is found.

The measuring apparatus can also serve as a 3D shape measuring apparatus.

Advantageous Effects of Invention

According to the present invention, when an entire continuous shape is desired to be measured in a wide range, only a procedure of selecting on arbitrary reference field of view and measuring a 3D shape enables an adjacent field of view to be automatically measured. This can reduce operational trouble and improve ease of use for the operator.

BRIEF DESCRIPTION OF DRAWINGS

The preferred embodiments will be described with reference to the drawings, wherein like elements have been denoted throughout the figures with like reference numerals, and wherein;

FIG. 6 is a view illustrating an example state of a memory device;

FIG. 7 is an explanatory view schematically illustrating an operation; and

DESCRIPTION OF EMBODIMENTS

With reference to the drawings, an embodiment of the present invention will be described below in more detail. Note that the present invention is not to be limited by the contents described in the following embodiments and examples. Additionally, the components in the embodiments and examples described below include those one skilled in the art can readily conceive or being substantially the same, i.e., the so-called equivalents. Furthermore, the components disclosed in the embodiments and examples described below may be combined as appropriate or may also be selected as appropriate for use.

Figure 1:
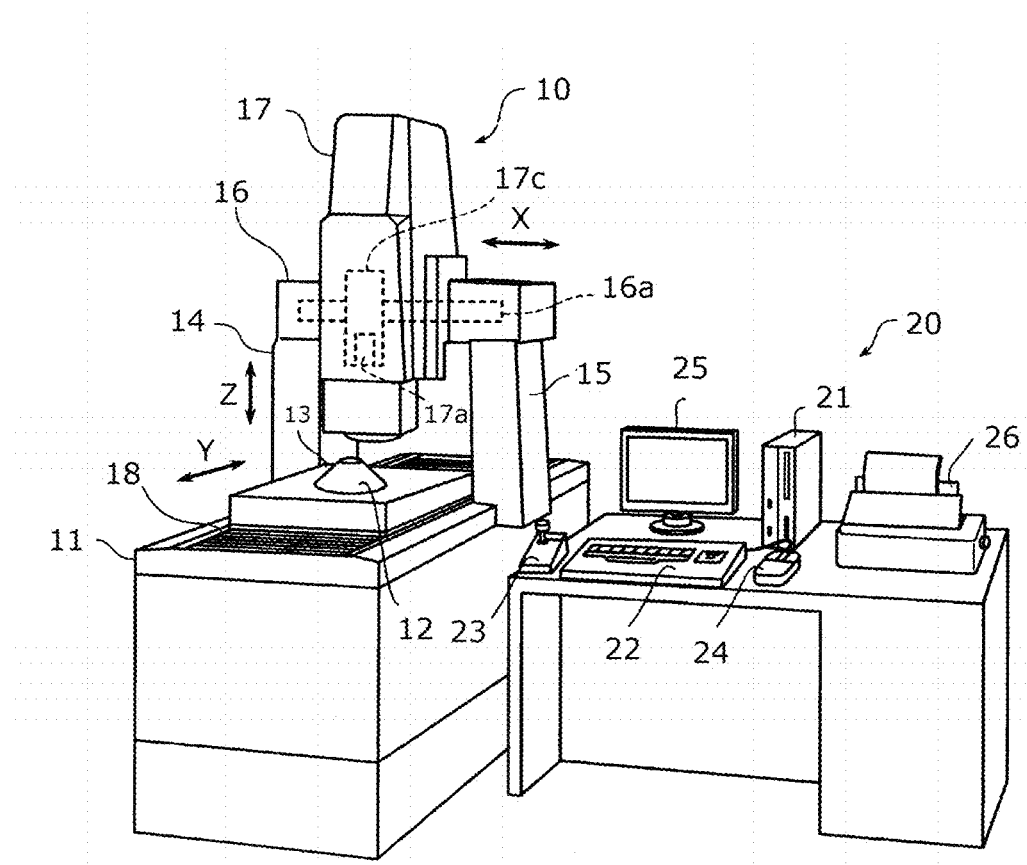
FIG. 1 is a view illustrating an entire image measuring apparatus according to an embodiment of the present invention.

FIG. 1 is a view illustrating an entire image measuring apparatus according to the embodiment.

The image measuring apparatus is provided with: an image measuring apparatus 10 on which a camera 17*a* serving as an image capturing device to capture the image of a workpiece 12 or an object to be measured is mounted; and a computer (hereafter referred to also as "PC") 20 which is electrically connected to the image measuring apparatus 10 and employs programs stored therein to provide drive control to the image measuring apparatus 10.

The image measuring apparatus 10 is configured as follows. That is, a cradle 11 is equipped thereon with a stage 13 on which the workpiece 12 is placed, and the stage 13 is driven by a Y-axis drive mechanism 18 in the Y-axis direction in parallel to the upper surface of the stage 13. There are provided support arms 14 and 15 which extend upwardly and are secured to the respective center of both side edges of the cradle 11, and an X-axis guide 16 which is secured to both upper end portions of the support arms 14 and 15 so as to couple therebetween. The X-axis guide 16 supports an image capturing unit 17 configured to capture the image of the workpiece 12. The image capturing unit 17 can be driven by an X-axis drive mechanism 16*a* along the X-axis guide 16 in the X-axis direction orthogonal to the Y-axis direction in parallel to the upper surface of the stage 13. Furthermore, the image capturing unit 17 has an image capturing device 17*a* which employs a predetermined image capturing range as a measurement field of view. The image capturing unit 17 can be moved by a Z-axis drive mechanism 17c in the Z-axis direction orthogonal to the upper surface of the stage 13. As described above, the X-axis drive mechanism 16a, the Y-axis drive mechanism 18, and the Z-axis drive mechanism 17c constitute a position controller which drives the image capturing unit 17 relative to the stage 13 in the X-, Y-, and Z-axis directions which are orthogonal to each other.

The image measuring apparatus 10 according to this embodiment is configured to operate the camera 17a to capture images while the camera 17a being moved in the XY directions relative to the upper surface of the stage 13 and operated to scan in the Z-axis direction, and to detect the displacement (Z value) of the workpiece 12 in the Z axis direction at each measurement position by the PFF measurement from the measurement positional information of the camera 17a in the XY directions and the contrast information in each micro range of the images acquired at the positions. Note that the displacement in the Z axis direction may also be detected by means of a white light interferometer (WLI) other than from such contrast information. For example, the white light interferometer guides white light having a wide-band spectrum to the workpiece 12 and a reference surface, then allow the respective reflected beams of light to interfere with each other to thereby acquire the position at which the peak value of an interference signal of each pixel is observed, and detects the displacement of the workpiece 12 in the Z axis direction depending on the peak position of each pixel and the position of a reference plate that constitutes the reference surface.

Figure 2:
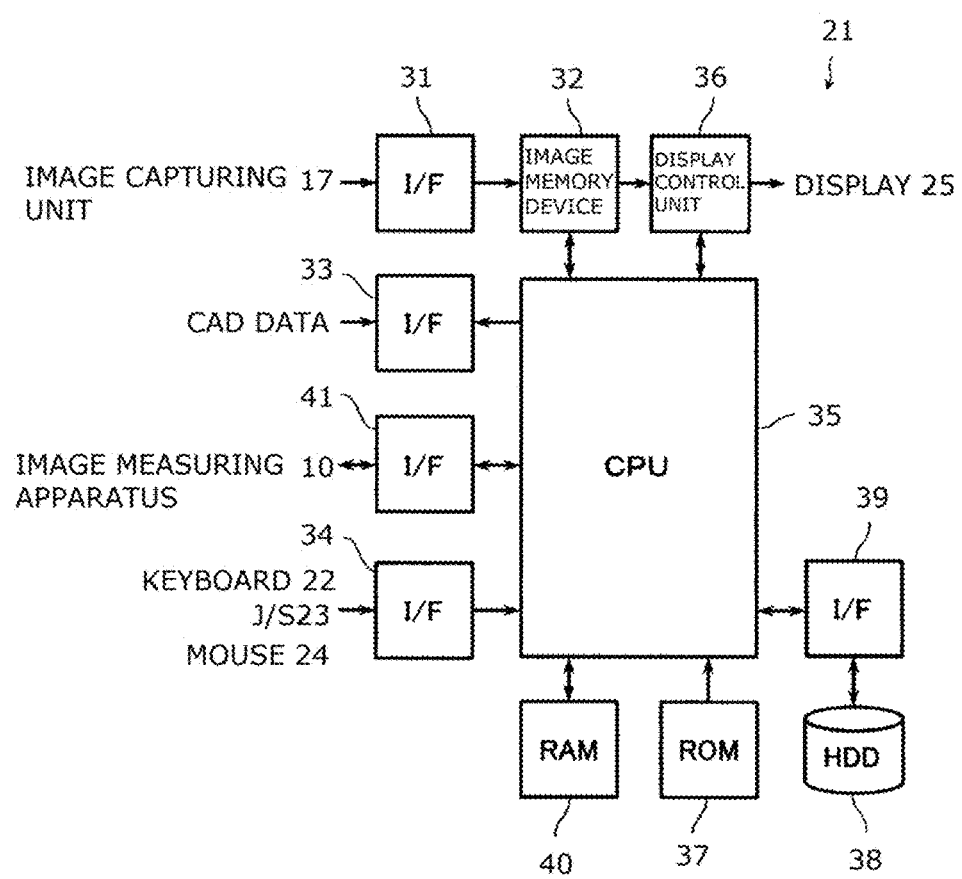
FIG. 2 is a block diagram illustrating the configuration of the apparatus.

The computer 20 has a computer main body 21, a keyboard 22, a joystick box (J/S) 23, a mouse 24, a display 25, and a printer 26. For example, the computer main body 21 is configured as shown in FIG. 2. That is, the image information of the workpiece 12 to be entered from the image capturing unit 17 is stored in an image memory device 32 through an interface (I/F) 31.

Furthermore, the CAD data of the workpiece 12 is entered to a CPU 35 through an I/F 33, and stored in the image memory device 32 after predetermined processing has been conducted in the CPU 35. The image information stored in the image memory device 32 is displayed on the display 25 through a display control unit 36.

On the other hand, the code information and the positional information to be entered on the keyboard 22, the J/S 23, and the mouse 24 is entered to the CPU 35 through an I/F 34. The CPU 35 executes various types of processing on the basis of macro programs stored in a ROM 37 and programs stored in a RAM 40 through an I/F 39 from an HDD 38.

The CPU 35 controls the image measuring apparatus 10 on the basis of programs through an I/F 41. The HDD 38 is a recording medium configured to store various types of data. The RAM 40 provides work areas for various types of processing.

Figure 3:
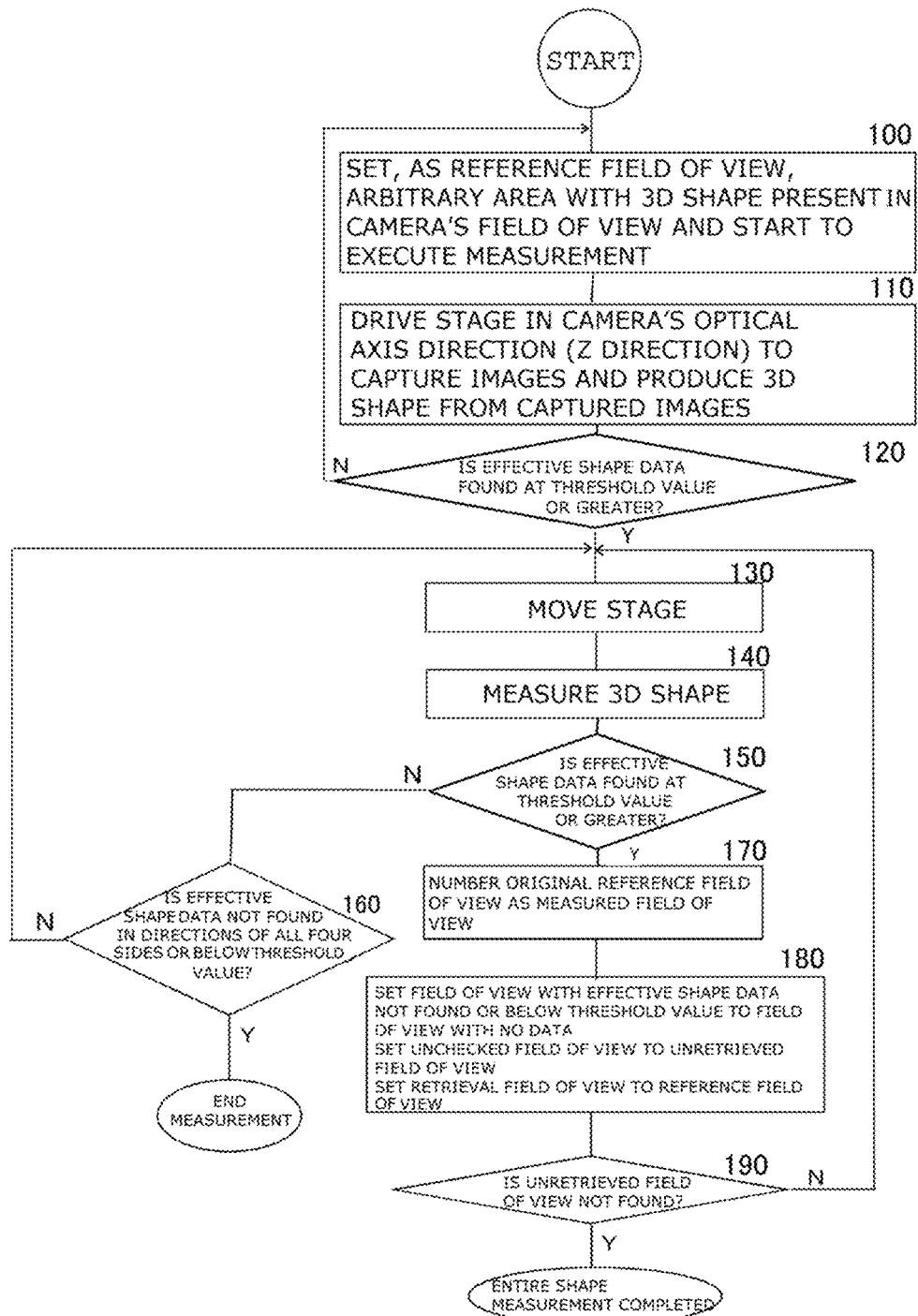
FIG. 3 is a flowchart for describing a measurement procedure of the embodiment.

Referring to FIG. 3, a description will be given of the measurement procedure of this embodiment.

Figure 4:
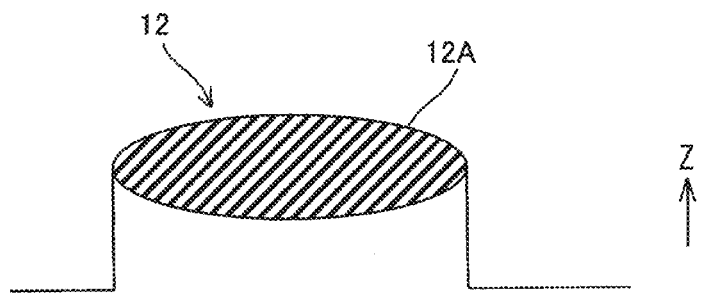
FIG. 4 is a view illustrating a typical object to be measured.

As a typical object to be measured, it is assumed to measure the shape of the workpiece 12 which has a measurement surface 12A (a measurement surface that is not continuously continued to infinity) with the edge sharply dropped as in FIG. 4.

The operator of the measuring apparatus sets, as a reference field of view, an arbitrary area with a 3D shape present in a camera's field of view and starts to execute measurement (Step 100).

When having started the measurement, the program drives the stage in the optical axis direction (Z direction) of the camera to capture a plurality of images and produces a 3D shape from the captured images (Step 110).

If effective shape data is found in the produced 3D shape (when the contrast value is greater than 0 in the PFF measurement or when the peak of an interference signal could be calculated in the WLI measurement) and the ratio thereof is equal to or greater than a threshold value that is determined in advance for the measured field of view (Yes in Step 120), the process determines that the reference field of view was set successfully and proceeds to the next step. On the other hand, if no effective shape data is found or the ratio is below the threshold value (No in Step 120), the process returns to Step 100 and re-selects a reference field of view.

Since the image capturing range of the camera has a rectangular shape, the stage is moved, while a certain overlap region is maintained, with the direction of each side of the rectangular area in the reference field of view being employed as a retrieval field of view (Step 130).

Figure 5:
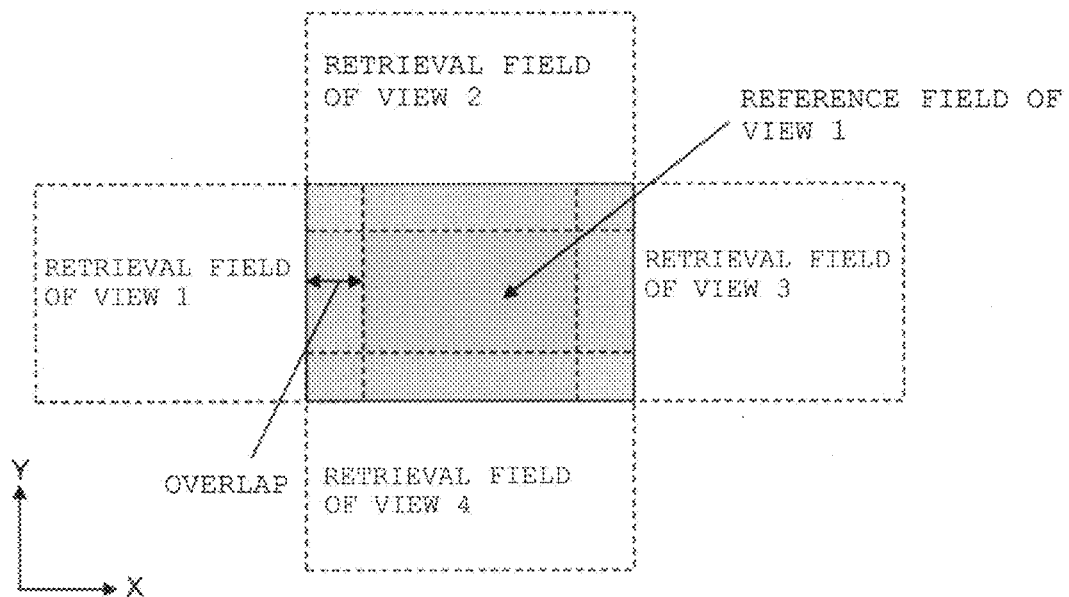
FIG. 5 is an explanatory view schematically illustrating an operation.

For example, as shown in FIG. 5, first, the stage is moved in the left-hand side direction of "the reference field of view 1". This place is taken as "a retrieval field of view 1" to perform the 3D shape measurement (Step 140).

If no effective shape data is found or the ratio is below a threshold value as a result of the measurement of "the retrieval field of view 1" (No in Step 150), it is determined that no shape is found at this position.

Next, with the upper side direction of "the reference field of view 1" employed as "a retrieval field of view 2", the 3D shape measurement is performed. Likewise, it is checked whether any effective shape data is found as a result of the measurement.

At this time, if no effective shape data is found or the ratio is below a threshold value, it is sequentially checked whether shape data is found in "a retrieval field of view 3" and then in "a retrieval field of view 4". If no effective shape data is found in all the directions of the four sides or the ratio is below a threshold value (Yes in Step 160), then the measurement is ended.

On the other hand, for example, if effective shape data is found in "the retrieval field of view 3" (Yes in Step 150), then the original "reference field of view 1" is redefined as "a measured field of view 1". At this time, it is specified in advance what percentage or greater the threshold value should be when a measured field of view is determined to be an effective measured field of view. When the threshold value is exceeded, the measured field of view is determined to be an effective measured field of view. If the threshold value is not exceeded, the field of view is determined to be a field of view with no data. Then, this position is numbered with address (X=0, Y=0) (Step 170).

Hereafter, with respect to this position, the position of movement in the right-and-left side direction is defined as X, and the position of movement in the up-and-down side direction is defined as Y.

On the other hand, the field of view in which no effective shape data is found or the threshold value is not exceeded is redefined as "the field of view with no data" and then recorded on the memory device as illustrated by way of example in FIG. 7. It is to be understood that the outside of this "field of view with no data" is not retrieved (autotraced).

On the other hand, the original "retrieval field of view 4" has not been checked, and is thus recorded on the memory as "the unretrieved field of view 1".

The aforementioned "retrieval field of view 3" is taken as a reference for searching for a next search field of view, and to this end, redefined as "the reference field of view 2" as shown in FIG. 7.

Next, the process defines, as "the retrieval field of view", places other than those that have been already recorded as "the field of view with no data", "the measured field of view", and "the unretrieved field of view" in each side direction of the rectangular area of "the reference field of view 2", and then sequentially checks whether shape data is found.

After the aforementioned processing is repeated, only "the field of view with no data", "the measured field of view", and "the unretrieved field of view" are left.

Next, the process redefines a position with "an unretrieved field of view" having a smaller index (in ascending order of recording) as "the reference field of view" and defines, as "the retrieval field of view", a place other than those that have been already recorded as "the field of view with no data", "the measured field of view", and "the unretrieved field of view" in each side direction of the rectangular area and then sequentially checks whether shape data is found.

When the aforementioned procedures are repeated until "the unretrieved field of view" is no more found (Yes in Step 190), only "the field of view with no data" and "the measured field of view" are finally left as recorded.

At this point of time, the process determines that the entire continuous shape has been completely measured.

On the other hand, if No in Step 160 and Step 190, then the process returns to Step 130.

The entire shape can be produced by coupling all the measurement results associated with "the measured field of view".

Figure 8:
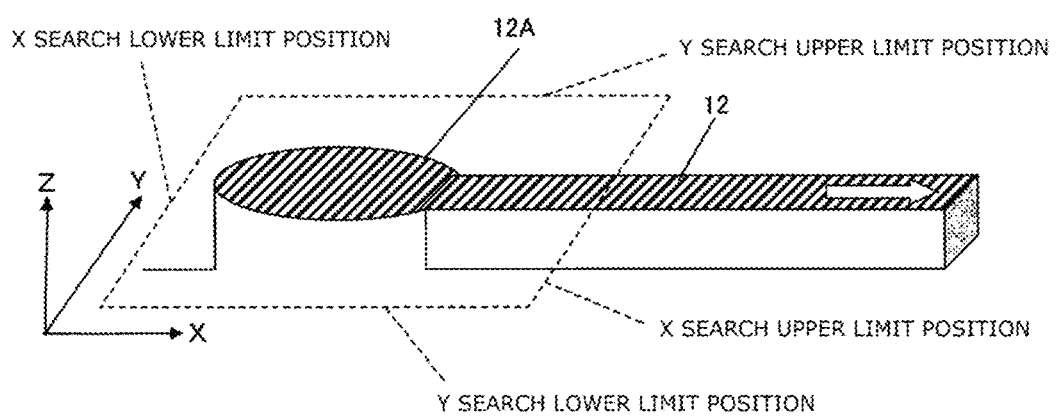
FIG. 8 is a view illustrating another example of an object to be measured.

On the other hand, suppose the case of not the shape that was described referring to FIG. 4 but the shape of the measurement surface 12A of the workpiece 12 that is continuously diverged as in FIG. 8. In this case, the limit position of a search range can be set in advance to thereby determine that the search is ended when the automatic search has been completed within that range.

That is, a retrieval range that exceeds one field of view is specified in coordinates in advance. Then, the process starts the auto-tracing from an arbitrary position within that range, so that any position beyond the coordinates of the retrieval range is excluded from the field of view to be auto-traced.

Furthermore, it is also possible to reduce the search time by limiting the search range in terms of the number of directions and fields of view.

Note that in the embodiment, the process searched the unretrieved fields of view in a right-handed spiral with the reference field of view at the center; however, the method for searching an unretrieved field of view is not limited thereto, but may also be followed, e.g., in a left-handed spiral. Furthermore, the camera may also be moved in place of the stage.

It should be apparent to those skilled in the art that the above-described embodiments are merely illustrative which represent the application of the principles of the present invention. Numerous and varied other arrangements can be readily devised by those skilled in the art without departing from the spirit and the scope of the invention.

The invention claimed is:

1. A 3-D shape auto-tracing method for allowing a computer to execute, when a continuous 3D shape of a size beyond a measurement range of one field of view is measured while the measurement range is moved:

a first step of performing numbering with a reference field of view at one area set first by an operator being defined as an origin point;

a second step of numbering a place adjacent to a side around the reference field of view, then automatically moving the measurement range to sequentially execute measurement at that position, checking whether shape data is found, storing measurement results, and recording, on a memory device, whether shape data is found at the numbered position;

a third step of employing a field of view with shape data found therein as a next reference field of view and numbering a place adjacent to a side around the reference field of view, then automatically moving the measurement range to sequentially execute measurement at that position other than a position at which measurement has already been made or no shape data is found, checking whether shape data is found, storing measurement results, and recording, on the memory device, whether shape data is found at the numbered position; and a fourth step of repeating the third step and determining that an entire continuous shape has been completely measured when any unmeasured position adjacent to a side around a position at which shape data is found is not found.

2. The 3-D shape auto-tracing method according to claim 1, wherein all the measurement results associated with the measured fields of view are coupled together, thereby producing an entire shape.

3. The 3-D shape auto-tracing method according to claim 1, wherein a limit position of a search range is set in advance to determine that the search is ended when an automatic search has been completed within that range.

4. The 3-D shape auto-tracing method according to claim 1, wherein a search time is reduced by limiting a search range in terms of a number of directions or fields of view.

5. A measuring apparatus comprising:

a stage configured to place thereon an object to be measured;

an image capturing device which is provided movably relative to the stage and is configured to capture an image of the object to be measured within a predetermined image capturing range narrower than a measurement range to output image information;

a position controller configured to move the image capturing device to a plurality of measurement positions within the measurement range and operate the image capturing device to scan in a direction perpendicular to the stage at each of the measurement positions; and a computer configured to compute a displacement in a scanning direction at each of the measurement positions on a basis of the image information in the predetermined image capturing range at each of the measurement positions acquired by the scanning of the image capturing device, the measuring apparatus being configured to measure a continuous 3D shape of a size beyond a measurement range of one field of view while the measurement range is moved, wherein the computer is provided with:

a first function of performing numbering with a reference field of view at one area set first by an operator being defined as an origin point;

a second function of numbering a place adjacent to a side around the reference field of view, then automatically moving the measurement range to sequentially execute measurement at that position, checking whether shape data is found, storing measurement results, and recording, on a memory device, whether shape data is found at the numbered position;

a third function of employing a field of view with shape data found therein as a next reference field of view and numbering a place adjacent to a side around the reference field of view, then automatically moving the measurement range to sequentially execute measurement at that position other than a position at which measurement has already been made or no shape data is found, checking whether shape data is found, storing measurement results, and recording, on the memory device, whether shape data is found at the numbered position; and a fourth function of repeating the third function and determining that an entire continuous shape has been completely measured when any unmeasured position adjacent to a side around a position at which shape data is found is not found.

6. The measuring apparatus according to claim 5, wherein the movement of the measurement range is made while a certain overlap region is being maintained.

7. The measuring apparatus according to claim 5, wherein the measuring apparatus serves as an image measuring apparatus.

8. The measuring apparatus according to claim 7, wherein the 3D shape is produced from a plurality of captured images acquired by driving the stage in an optical axis direction of the image capturing device to capture the images.

9. The measuring apparatus according to claim 7, wherein the image measuring apparatus is configured to operate the image capturing device to capture images while the image capturing device is being moved in XY directions parallel to an upper surface of the stage and operated to scan in a Z-axis direction verified to the upper surface of the stage, and to detect a displacement (Z value) of an object to be measured in the Z axis direction at each measurement position by the Point From Focus (PFF) measurement from measurement positional information of the image capturing device in the XY directions and contrast information in each micro range of an image acquired at that position.

10. The measuring apparatus according to claim 9, wherein when the contrast value is greater than 0, it is confirmed that shape data is found.

11. The measuring apparatus according to claim 7, wherein the image measuring apparatus is configured to guide white light having a wide-band spectrum to an object to be measured and a reference surface, allow the respective reflected beams of light to interfere with each other to acquire a position at which a peak value of an interference signal of each pixel is observed, and detect a displacement of the object to be measured in a Z-axis direction verified to the upper surface of the stage depending on the peak position of each pixel and a position of a reference plate that constitutes the reference surface.

12. The measuring apparatus according to claim 11, wherein when a peak of an interference signal can be calculated, it is confirmed that shape data is found.

13. The measuring apparatus according to claim 5, wherein the measuring apparatus serves as a 3D shape measuring apparatus.

* * * * *